United States Patent [19]
Rüdle

[11] 4,078,580
[45] Mar. 14, 1978

[54] MULTIWAY VALVE

[76] Inventor: Manfred Rüdle, Thomasackerweg 17, Esslingen-Berkheim, Germany

[21] Appl. No.: 682,338

[22] Filed: May 3, 1976

[30] Foreign Application Priority Data

May 2, 1975   Germany .......................... 2519547

[51] Int. Cl. ............................................. F16k 11/02
[52] U.S. Cl. .................................. 137/625.66; 92/99; 92/103 SD; 251/75
[58] Field of Search ..................... 251/75; 137/625.66; 92/103 SD, 99, 100

[56] References Cited

U.S. PATENT DOCUMENTS

| 721,324 | 2/1903 | Rayner | 92/100 |
|---|---|---|---|
| 3,183,789 | 5/1965 | Stelzer | 92/99 |
| 3,528,639 | 9/1970 | Grayson | 251/75 |
| 3,794,075 | 2/1974 | Stoll et al. | 251/75 |
| 3,820,567 | 6/1974 | Bouteille | 137/625.66 |
| 3,856,259 | 12/1974 | Doherty, Jr. | 251/75 |

FOREIGN PATENT DOCUMENTS

| 2,061,545 | 6/1972 | Germany | 137/625.66 |
|---|---|---|---|
| 2,125,174 | 11/1972 | Germany | 137/625.66 |
| 2,329,068 | 2/1975 | Germany | 137/625.55 |

Primary Examiner—Martin P. Schwadron
Assistant Examiner—G. L. Walton
Attorney, Agent, or Firm—Watson, Cole, Grindle & Watson

[57] ABSTRACT

A multiway valve with a spool as a closure member is axially movable in a central bore in a valve casing and has associated with each of its axial ends diaphragms of elastic material secured by their outer circumference to the casing and operating with a snap action. Associated with each of the diaphragms is a support wall bearing on a face of the diaphragm made of rigid material and made up of a plurality of flexibly-assembled sector-shaped component parts to provide flexible support of the diaphragm.

6 Claims, 8 Drawing Figures

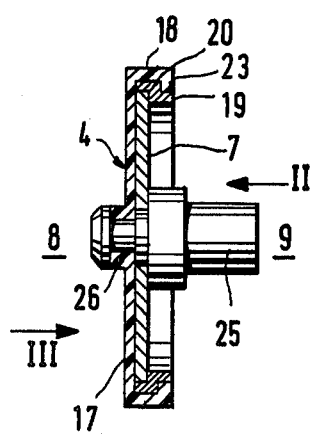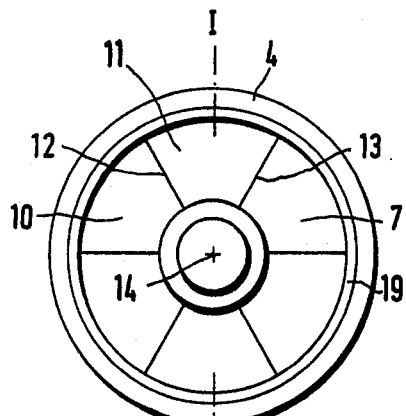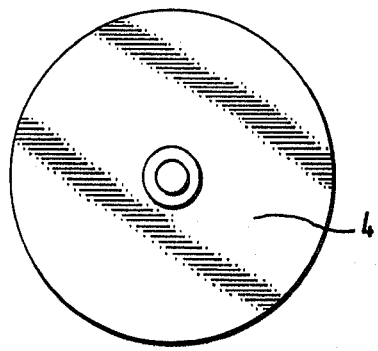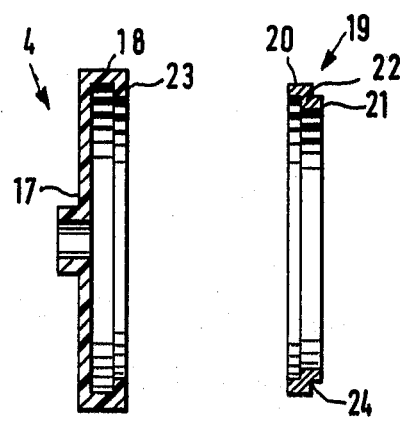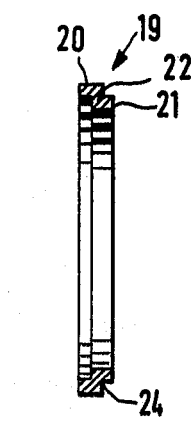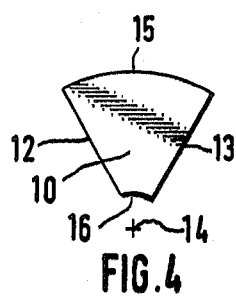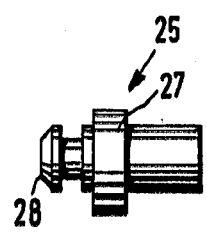

MULTIWAY VALVE

BACKGROUND OF THE INVENTION

1. Field of the Invention

The invention relates to multiway valves.

2. The Prior Art

This invention relates to a multiway valve of the kind having a slide axially movable in a central bore in a casing as a closure member, with which there are associated in the vicinity of both its axial ends, control and/or support diaphragms secured by their outer circumference to the casing, the diaphragms being so formed that they move with a snap action from one end position into the other under the influence of a control pressure. In valves of this kind, the control and/or support diaphragms have a relatively short life-expectancy.

SUMMARY OF THE INVENTION

An object of the present invention is accordingly to provide in a valve of the kind aforesaid a control and/or support diaphragm which has an adequate life-expectency even under high load, in which high control pressures, e.g. of 8 bar or more, and valves strokes can be used, and which ensures non-overlapping operation of the closure member, apart from the fact that other drawbacks of known arrangements of a comparable kind are avoided.

According to the present invention there is provided a multiway valve having a spool as a closure member axially movable in a central bore in a valve casing and with which there are associated, in the vicinity of its axial ends, control and/or securing diaphragms secured by their outer circumference to the casing, these diaphragms being so formed that, in use, they move with a snap action from one end-position to the other, under the influence of a control pressure; in which there is associated with each of the diaphragms, which are made of rubber or plastic materials with rubber-elastic properties, a support wall which, on the one hand, allows movement of the diaphragms, and, on the other hand, provides support for the diaphragms, the support wall bearing on a face of the diaphragm, being made of metal or other rigid material, and being made up of a plurality of flexibly-assembled component parts so as to provide a flexible support for the diaphragm.

The support wall may be made up for example of several, preferably six, component parts which are identical in size and form, and are substantially sector-shaped.

The diaphragm support wall ensures sufficient life-expectancy of this highly-stressed part of the valve, to make it possible to provide a new support construction and high control pressure, for example of up to 8 bar and a valve stroke enabling a non-overlapping operation of the spool.

BRIEF DESCRIPTION OF THE DRAWINGS

An embodiment of the invention will now be described, by way of example, with reference to the accompanying drawing, in which:

FIG. 1 is an axial sectional view of a control and/or securing diaphragm assembly for a multiway valve according to the present invention, and in an inoperative position, FIG. 2 is a view corresponding to FIG. 1 in the direction of the arrow II in FIG. 1, FIG. 3 is a view corresponding to FIG. 1 in the direction of the arrow III in FIG. 1, FIG. 4 is a front view of a sector-like component of a support wall of the diaphragm assembly shown in FIG. 1, FIG. 5 is an axial sectional view of diaphragm portion of the diaphragm assembly shown in FIG. 1, FIG. 6 is an axial sectional view of a securing ring of the diaphragm assembly shown in FIG. 1, FIG. 7 is a side view of a securing pin of the diaphragm assembly shown in FIG. 1.

DESCRIPTION OF THE PREFERRED EMBODIMENTS

Figure 8:
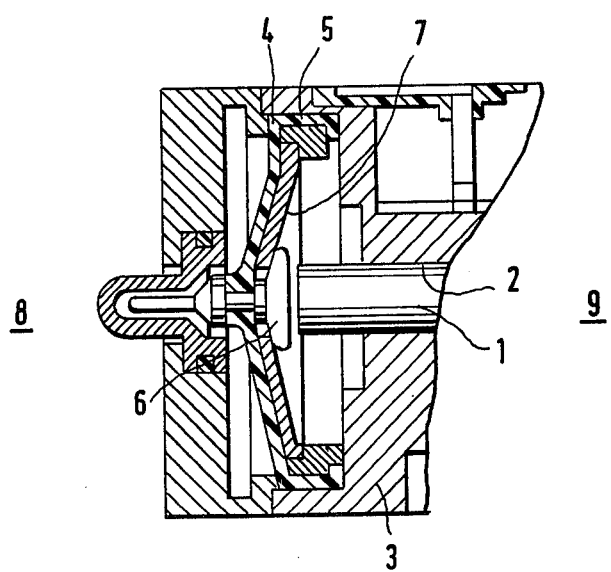
FIG. 8 is a fragmentary sectional side view of a multiway valve fitted with a control and/or securing diaphragm assembly, according to the present invention.

Referring to the drawings, a multiway valve has a slide or spool 1 as a closure member, which is axially movable in a central bore 2 in a casing 3, and with which there are associated, in the vicinity of its axial ends, control diaphragms 4, which are secured to the casing at 5 by their outer circumference, and serve to actuate the spool with their central zone, and which are so designed that they hold the spool in both end positions, and move with a snap action from one end position to the other under the influence of a control pressure. Valves of this kind are known, embodiments thereof being described for example, in the German Offenlegungsschrift No. 2 125 174. Such a valve will therefore not be described herein in close detail with reference to its construction and mode of operation. Only the following is to be noted: the to-and-fro motion of the spool is controlled with the help of control diaphragms, and the spool can be suspended in a floating fashion with the help of support diaphragms in order to avoid friction; and control diaphragms and support diaphragms may be separate elements, or may be combined into one component.

In order to increase the life-expectancy of the control and/or support diaphragms, even with high loading capacity, provision is made according to the invention for there to be associated with each of the diaphragms 4, consisting of rubber or plastic material with rubber-elastic properties, a support wall 7, which, on the one hand, allows movement of the diaphragm, and, on the other hand, provides support therefor, this support wall 7 (see FIG. 1) bearing on the diaphragm, preferably on the side facing the interior of the valve, i.e., th side facing away from the operative side 8. This support wall 7, which, like its associated diaphragm 4, is circular, consists of metal or a similar rigid material, thus providing support for the diaphragm, and is assembled from flexibly-combined component parts 10, 11 which are sector-like in shape, as can be seen, for example, from FIGS. 2 and 4. In the embodiment shown in the drawing, six sector-like components are provided, having the same size and shape (see FIG. 2). With the help of sector-like component parts, flexible support is provided for the control and/or support diaphragms.

As can be seen particularly clearly for example from FIG. 4, the side edges 12, 13 of the sector-like component parts extend radially from the centre 14 of the support wall 7 to its peripheral edge, and the sector-like components are defined at either outer and inner peripheries respectively by arcuate edges 15, 16.

The diaphragm 4 has a marginal edge portion 18, bent over at about 90° to the diaphragm surface, and directed towards the interior of the valve so as to form a circumferential, axially projecting flange. The flange 18 extends around the outer periphery of the support wall 7, and engages from the outside around a securing ring 19, in which the sector-like component parts 10, 11 are inserted, and which coaxially surrounds the support wall from the outside. The securing ring 19 thus surrounds the support wall 7 and its sector-like components, and the flange 18 of the diaphragm surrounds the securing ring. As is apparent, particularly from FIGS. 1 and 6, the securing ring 19 has a substantially Z-shaped cross-section defined by an outer portion 20, an inner portion 21, and a crosspiece 22 connecting the outer and inner portions, which are parallel to each other. The radially outer portion 20 of the securing ring 19, bears from the outside on the outer circumferential face of the support wall 7, and the crosspiece 22 bears, from the side 9 facing the interior of the valve, on a face of the support wall. A circumferential lip 23 on the flange 18 projects therefrom radially inwards and parallel to the diaphragm face 17 and engages in the step 24 of the securing ring from the outside. In this way, a secure yet flexible diaphragm arrangement is provided, which is simple in construction and easy to assemble. If in the passage of time any parts are damaged, these individual parts may be replaced without sacrificing the entire diaphragm assembly.

The securing ring 19 may be made of the same material as the support 7, and preferably of metal, e.g., steel or, if necessary, brass.

In order to provide an even better support for the assembly, the support wall 7 and diaphragm 4 have a common central securing pin 25, which may, for example, be cylindrical in form. The diaphragm 4 is connected to the pin 25 as shown at 26 in FIG. 1. The pin 25 has a collar 27, and the diaphragm 4 and the support wall 7 are seated between a rivet head 28 on the outer end of the pin and the collar 27. The pin 25 thus serves to provide support for the diaphragm and the support wall, centrally, while support is provided at their outer circumference by the flange 18 and the lip 23 of the diaphragm 4. The radially inner edge 16 of each sector-like component, serving as a support on the securing pin 25, is as already stated, arcuate, its radius of curvature corresponding to that of the pin 25 thereat.

The diaphragm assembly can serve as a control diaphragm, forming the movable wall of a control space communicating with a control pipe, at the side of the diaphragm facing away from the central bore 2. In this case, the securing pin 25 may serve to actuate the spool 1, as shown in FIG. 8. The diaphragm assembly can also serve as a support diaphragm, with whose help the spool is floatingly suspended. The arrangement can also be such that a control diaphragm is present as well as a support diaphragm, and, in this case, the control diaphragm can be identical in design to the support diaphragm support.

The arrangement can also be such that only one of the two diaphragms, i.e. the support diaphragm or the control diaphragm, as described above, is formed by a diaphragm and a support wall.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A multiway valve comprising a valve casing with a central bore therethrough and a closure member axially movable in said central bore; said closure member having separate circular elastic diaphragms attached thereto in the vicinity of its axial ends, said diaphragms being secured at their outer circumferences to said valve casing, a circular rigid support wall positioned adjacent an inner face of each diaphragm, each said circular support wall continuously supporting the adjacent diaphragm while allowing for movement of same, each support wall comprising a plurality of arcuate, flexibly-assembled parts continuously connected at their side edges; each said diaphragm including at its outer circumference an axially projecting flange which functions to engage the respective adjacent support wall around its outer circumference.

2. The multiway valve according to claim 1, wherein an annular securing ring is positioned between the outer circumference of each of said support walls and the axially projecting flange of the adjacent support wall.

3. The multiway valve according to claim 2 wherein each axially projecting flange of each diaphragm includes an annular, peripheral lip which extends in an inward radial direction, wherein each said annular securing ring is stepped in a Z-shaped cross section so as to have a cross piece between two outer sections; wherein one outer section of said securing ring is positioned to bear against the periphery of the respective support wall, the crosspiece is positioned to extend radially inwardly of the respective support wall and to bear against a face of the support wall; and wherein the lip of each diaphragm is positioned to contact the crosspiece of the respective securing ring so as to secure the support wall to the respective diaphragm.

4. The multiway valve according to claim 1 wherein each end of said closure member includes a securing pin having a head and a spaced apart collar, and wherein the respective adjacent diaphragms and support walls are positioned at their radial centers in the space between the respective heads and collars.

5. The multiway valve according to claim 1 wherein each said diaphragm and support wall are so constructed that as said closure member moves in a reciprocating axial direction said diaphragms and support walls move with a snap action from one axial position to another.

6. The multiway valve according to claim 1 wherein each said support wall bears on a face of the adjacent diaphragm facing the interior of the valve.

* * * * *